United States Patent Office 3,429,811
Patented Feb. 25, 1969

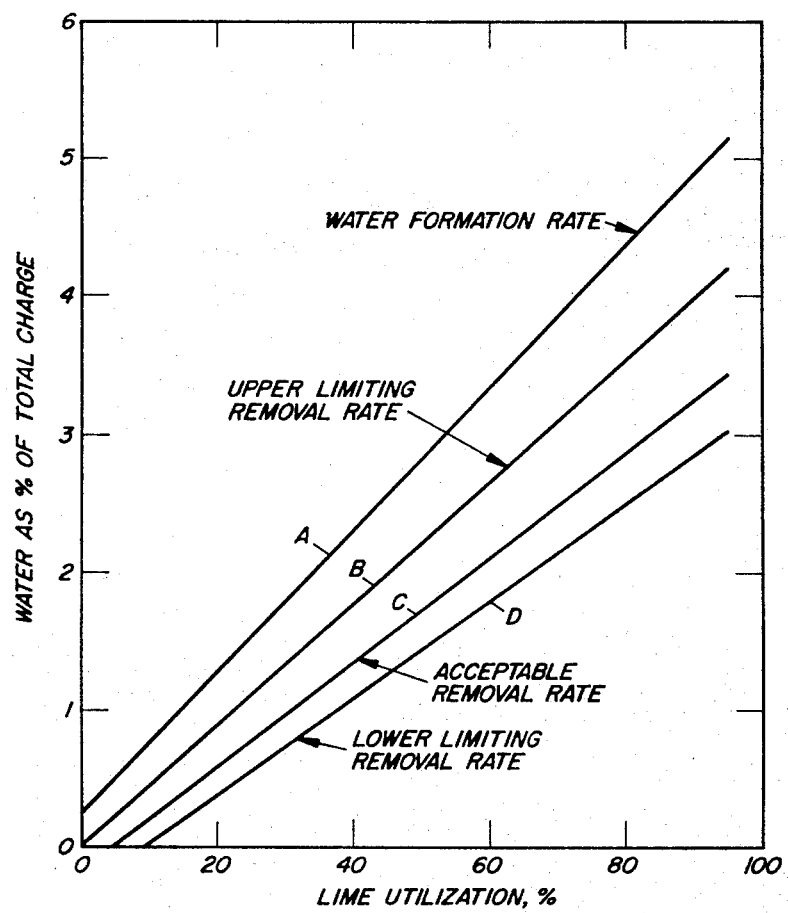
M. L. ROBBINS
F. LEDER
G. R. CHLUDZINSKI
INVENTORS
BY
PATENT ATTORNEY

3,429,811
PREPARATION OF OVERBASED SULFONATES
Max L. Robbins, South Orange, Frederic Leder, Elizabeth, and George R. Chludzinski, South Orange, N.J., assignors to Esso Research and Engineering Company, a corporation of Delaware
Filed Aug. 17, 1966, Ser. No. 573,096
U.S. Cl. 252—33                                8 Claims
Int. Cl. C10m 1/40

ABSTRACT OF THE DISCLOSURE

An overbased metal sulfonate is prepared by dispersing hydrocarbon sulfonic acid and/or metal hydrocarbon sulfonate in a hydrocarbon oil, adding hydrated lime and promoter to the dispersion and then contacting the mixture with carbon dioxide in a quantity sufficient at least to convert to colloidally dispersed calcium carbonate all of the lime that is not used for formation of sulfonate salt. The point of novelty in the invention is the control of the water content of the mixture during the reaction so that it is at all times within the limits of 0.1 to 1.75 weight percent, based on the total mixture.

This invention concerns an improved process for making overbased metal sulfonates, and an improved product. More particularly, the invention concerns the preparation of an overbased sulfonate wherein calcium carbonate is formed in situ in oil by the carefully controlled reaction of lime and carbon dioxide in the presence of said sulfonate and a promoter, while carefully controlling the percentage of water present during the reaction.

Overbased metal sulfonates are well known in the art as desirable additives for crankcase lubricants. See for example, U.S. Patents 2,839,470; 2,856,360; 3,057,896, etc. Their desirable functions include suspension of sludge, prevention of deposit formation, and imparting of rust inhibiting properties to the lubricants. They are also known as good inhibitors of rust in lubricant and other oil compositions. Briefly, an overbased sulfonate is one containing excess metal over that required for complete neutralization of the sulfonic acid. Usually, overbasing is accomplished in situ in mineral lubricating oil by adding excess metal base, e.g., lime, to the sulfonate or sulfonic acid, and then neutralizing the excess metal base with carbon dioxide. The best theory is that the colloidal dispersion of calcium carbonate that is thereby formed in the oil is stabilized by the sulfonate, which forms a protective covering around the carbonate to thereby prevent undesirable agglomeration of the colloidal-size carbonate crystals. Otherwise, this agglomeration can lead to precipitation of the carbonate, particularly when making overbased sulfonates of high base number. Frequently, in the overbasing of sulfonates, the excess metal base is added in the presence of a promoter which can be any of a wide number of compounds as disclosed, for example, in British Patent 782,058.

It has now been found in accordance with the present invention that by controlling the amount of water within certain critical concentration levels in the reaction mixture, formation of haze in the final product is inhibited and in addition the formation of precipitates, with consequent low filter rates and loss of basicity, is avoided. The water may be present as water that has been introduced into the reaction mixture, as well as water that is formed by reaction of metal base with carbon dioxide.

The overbased sulfonate of this invention is prepared by dispersing sulfonic acid and/or metal sulfonate in a hydrocarbon oil, e.g., a petroleum lubricating oil, adding a promoter to the dispersion, thereafter adding lime to the resulting mixture and then blowing a stream of carbon dioxide through the mixture of reactants. Conditions are maintained during the reaction so that a portion, but not all, of the water formed by reaction of the metal base with carbon dioxide to give calcium carbonate is removed from the reaction mixture. It has been found most advantageous to control conditions so that about 60 to about 80 percent of the water that is formed during the reaction is continuously removed. If too little water is allowed to remain in the reaction mixture, the reaction will not proceed. If too much of the water in the mixture is permitted to remain, colloid agglomeration results, causing haze and precipitation with a consequent lowering of the base number of the product.

The drawing is a graphical presentation of data showing the effects of removing too much water and of removing insufficient water from the reaction mixture during the course of the reaction.

The sulfonates that are overbased by use of the present invention can be salts of any of the metals whose sulfonates have been used in the art, including those of sodium, lithium, potassium, iron, aluminum, zinc, manganese, cadmium, etc. The invention is particularly applicable to the overbasing of alkaline earth metal salts, including calcium, strontium, and barium salts, and it is especially applicable to the preparation of a high base number calcium sulfonate.

The starting sulfonates used in the present invention may be either neutral sulfonates, i.e., where the sulfonic acid is neutralized with an equal molar equivalent amount of metal base, or they may have been overbased to a mild degree, e.g., to a base number of say 30 or 40. One may also start with a sulfonic acid in which case additional lime will be used to convert the acid to the salt.

Sulfonic acids used in this art are classified generally as either petroleum sulfonic acids or synthetic sulfonic acids. Petroleum sulfonic acids are produced by treating petroleum fractions, usually lubricating oil distillate fractions, the so-called white oil distillates, or other petroleum fractions, e.g., petrolatum, with suitable sulfonating agents, including sulfur trioxide, concentrated sulfuric acid and fuming sulfuric acid. Synthetic sulfonic acids are prepared by treating relatively pure synthetic hydrocarbons in the same manner.

Synthetic sulfonic acids are usually prepared by sulfonating alkylated aromatic hydrocarbons having alkyl groups totalling about 10 to 33 carbon atoms, e.g. sulfonated products of alkylated aromatics such as benzene, toluene, xylene, and naphthalene, alkylated with wax hydrocarbons, olefins, olefin polymers, etc. Typically, benzene is alkylated with polymer of pyropylene or butylene, e.g. butylene trimer and then sulfonated. The natural or synthetic sulfonic acids used in this invention include alkane sulfonic acids, aromatic sulfonic acids, alkaryl sulfonic acids and aralkyl sulfonic acids. Specific details on the preparation of sulfonic acids need not be given here because the sulfonation of hydrocarbons is well known to the art.

While the principles of this invention can be applied to the overbasing of salts of petroleum sulfonic acids or synthetic hydrocarbon sulfonic acids having molecular weights ranging between about 400 and about 1200, they are more generally applicable to those derived from sulfonic acids having molecular weights in the range of about 400 to about 600 and preferably about 420 to 550.

This invention is particularly applicable to the overbasing of calcium sulfonates and is especially advantageous for preparing an overbased calcium sulfonate having a total base number of at least 225. Base number is defined in numerical terms equivalent to milligrams of KOH per gram of the material. The importance of overbasing a sulfonate is an economic one; the higher the base number the more benefit one obtains per unit weight of sulfonate. There are a number of prior art processes that are suitable for the preparation of overbased sulfonates having base numbers as high as about 200 but it is usually difficult to prepare products having total base number in excess of about 225 and higher. It is especially desirable to prepare those having 300 to 350 total base number.

While promoters that may be used within the broad aspects of this invention include those known to the art for this purpose, e.g. aliphatic monohydric alcohols such as isopropyl alcohol, polyhydric alcohols such as ethylene glycol, alkyl phenols such as nonyl phenol, etc., it is preferred to employ an amine and most desirably an alkanol amine, particularly when products of 250 to 300 base number or higher are being prepared. The function of the promoter is not clearly understood although it is evident that it assists in the takeup of $CO_2$ into the reaction, probably through the formation of an intermediate reaction product of $CO_2$ and the promoter.

The preferred amine promoters include the alkylene polyamines of from 2 to 3 carbon atoms per alkylene group and 2 to 4 amino groups per molecule, such as ethylene diamine, propylene diamine, diethylene triamine, dipropylene triamine, as well as primary, secondary, and tertiary alkyl amino alcohols containing from 2 to 5 carbon atoms per alkyl group. Suitable amino alcohols, i.e. alkanolamines, include for example, ethanolamine, diethanolamine, 2-amino-2-methyl propanol-1, 2-amino-2-methyl butanol-1, etc. The amino compounds must be those that retain sufficient water solubility or affinity to ensure operability in the process. A particularly effective promoter is monoethanolamine.

Optionally, an alkyl phenol can be employed as an auxiliary promoter, although generally this is not necessary when the promoter is an alkanolamine. Suitable alkyl phenols include mono- and polyhydroxy aryl compounds having at least one alkyl group containing from 4 to 20 and preferably from 6 to 12 carbon atoms. The aryl groups include phenyl and naphthyl groups. Examples of such compounds include nonyl phenol, isooctyl phenol, diamyl phenol, cetyl phenol, amyl naphthol, butyl cresol, dilauryl phenol, diisobutyl phenol, nonyl cresol, etc.

Auxiliary promoters that are hydrophilic in nature, such as sodium xylene sulfonate, are sometimes useful also.

In some cases, auxiliary stabilizers can be used in preparing overbased sulfonates by the process of this invention, although stabilizers are ordinarily not necessary when the sulfonates are salts of sulfonic acids of no greater than about 550 molecular weight. A particularly useful class of such stabilizers is fatty acids. These include natural or synthetic, substituted or unsubstituted, saturated or unsaturated, mixed or unmixed fatty acids having about 12 to 24, e.g. 16, 18 or 20 carbon atoms per molecule. Examples of such acids include lauric, myristic, palmitic, stearic, 12-hydroxy stearic, arachidic, oleic, ricinoleic, linoleic, hydrogenated fish oil, tallow acids, tall oil fatty acids, etc. Also useful is a low price fatty acid material which is known under the general name of iso-oleic acid. This material comprises chiefly elaidic acid with minor amounts of oleic acid (9-octadeceneoic acid), and other isomers of oleic acid, e.g. 12-octadeceneoic acid, and linolinic, linoleic, stearic, palmitic acid, etc. Iso-oleic acid primarily differs from pure oleic acid in that its chief component, i.e. elaidic acid, is in the cis form, rather than in the more common trans form of oleic acid.

Another source of fatty acid is tall oil, which is the liquid resinous material obtained in digestion of wood pulp for paper manufacture. Commercial tall oil generally comprises a mixture of about 40 to 70 wt. percent fatty acids, principally $C_{18}$ acids, about 30 to 60 wt. percent of resin acids and 0.5 to 10 wt. percent of unsaponifiables, including sterols, higher alcohols, waxes and hydrocarbons. Tall oil will vary in its proportion of these constituents depending on a number of factors, e.g. geographic location of the trees furnishing the wood pulp. The $C_{18}$ fatty acid of the tall oil is a mixture of both cis and trans oleic acids, linoleic acid, linolenic acids and some saturated acids. The resin acids of the tall oil include abietic acid, neo-abietic acid, dihydroxy abietic acid, palustric and isodextropimaric acids. Fatty acids from tall oil are separated from the other materials by suitable methods, and are commercially available as tall oil fatty acids.

When fatty acids are used in this invention as auxiliary stabilizers they are used in amounts of from 3 to 25 wt. percent.

A particularly effective procedure for preparing overbased calcium sulfonates in accordance with the present invention can be briefly described as follows: the metal sulfonate, or sulfonic acid, or mixed salt and acid, preferably in oil solution for ease of handling, is added to a quantity of hydrocarbon oil diluent e.g., a petroleum lubricating oil fraction, such that the final product will have the desired sulfonate concentration. Then the promoter or promoters are added to this mixture in the reactor. After all of these liquid components of the reaction mixture have been blended together, the entire quantity of lime in the form of dry slaked lime, i.e. $Ca(OH)_2$ is stirred in. The mixing of the liquid reactants and the lime can be made easier by heating, e.g. to a temperature in the range of about 140 to 200° F. This facilitates stirring and at the same time reduces the amount of additional heating needed to bring the mixture up to reaction temperature.

The reaction mixture cannot be completely dry; otherwise the reaction will not proceed. There must be present initially at least 0.1 wt. percent of water. The effective initial water concentration depends somewhat on the molecular weight range of the sulfonic acids whose salts are being used. Thus for sulfonic acid molecular weights of up to about 600, initial water contents of the reaction mixture may range from about 0.1 to 0.5 wt. percent, whereas for salts of higher molecular weight sulfonic acids, e.g. 800 or 900, somewhat higher initial concentrations of water, e.g. 0.5 to 0.8 percent may be necessary. This initial water is introduced along with the slaked lime or the promoter, for example. The water content is then allowed to build up gradually during the reaction until it is about 1.5 to 1.75 wt. percent at the end of the reaction.

To ensure a clear product when a calcium sulfonate that is derived from a sulfonic acid of molecular weight in the range of about 430 to 550 is overbased to a total base number in the range of 250 to 330, it has been found advantageous to employ an initial water content of about 0.1 to 0.4 weight percent and to adjust conditions such that the rate of increase of water concentration during the reaction is within the limits of about 0.4 to 0.55 wt. percent for each 100 units of base number.

After the lime has been added, the mixture is heated to the reaction temperature, which will normally be in the range of from about 230 to about 290° F. and preferably in the range of from 250 to 275° F. Pressure will normally be atmospheric or slightly less, e.g. $-1$ to $-2$ p.s.i.g. When the desired conditions have been attained, a stream of carbon dioxide is passed through the mixture while the latter is being agitated. There is introduced into the reaction vessel over the reaction period at least sufficient carbon dioxide to convert to a calcium carbinate all of the lime over and above that which may have been needed for converting sulfonic acids to calcium salts, if such is the case. Usually about 5 to 10 mole percent excess $CO_2$ is used to compensate for $CO_2$ losses. Reaction conditions are maintained such that a portion, but not all of the water that is formed in the reaction of carbon dioxide with lime is removed from the reaction mixture during the entire reaction time. Preferably about 60 to 80 percent of the water thus formed is removed. Stated in another way, the build-up of water concentration in the reaction mixture will be at about 20 to 40 percent of the rate of calcium carbonate build-up as the reaction proceeds, but as previously stated, the build-up of water concentration is not permitted to proceed to the extent that the water concentration will exceed 1.75 wt. percent of the solid and liquid material in the reaction mixture.

The control of water removal can be effected in one of several ways. For example, the rate of carbon dioxide introduction can be adjusted so that there is an excess over the amount that will react with the lime at any one time and a portion of the water will be carried off with this excess. Another method is to introduce the carbon dioxide at a relatively slow rate over a longer period of time and to employ a sufficiently high temperature so that a portion of the water will be continuously boiled off. If desired, a stream of inert gas can be introduced into or above the reaction mixture along with the carbon dioxide to carry off a portion of the water. Water removal can also be controlled by reducing the pressure on the reaction vessel below atmosperic. Conveniently, the amount of water present in the reaction mixture at any time can be determined by analysis of a small sample of the reaction mixture withdrawn from the vessel, e.g. using the Karl Fischer water determination technique. Alternatively, the stripped water can be collected and measured, and a mass balance calculated to give water concentration in the vessel. Normally, no measurement technique to determine the amount of water removed need be used once the conditions of temperature, pressure, rate of gas introduction, reaction time, etc. have been established for a particular overbasing system as long as the reaction components, proportions, promoters, etc. remain unchanged.

While continuous flow reactions are possible in overbasing sulfonates, it is generally preferred to employ batch operation. Reaction times will normally range from about 2 to 8 hours, e.g., 5 or 6 hours. Progress of the reaction can be followed by withdrawing a sample of the mixture and testing for sediment, which will indicate the presence of unreacted lime. Once a desired set of conditions has been established, proper reaction time will be essentially the same for successive batches.

After the reaction is complete, removal of the additional water that is not desired in the finished product can be effected by continuing with any of the water removal techniques already described. Conveniently, undesired water can be removed by increasing the temperature, e.g. to 400° F., and blowing with nitrogen or other suitable gas. To prevent haze and colloid agglomeration in the finished product it is advisable to reduce the water concentration so that it does not exceed about 0.5 weight percent. The reaction product is then filtered as, for example, through a plate and frame press or a vacuum rotary filter using a diatomaceous earth filter aid. The product can then be sent to storage or blended into a finished lubricating oil composition.

The extent of overbasing that is attained in a sulfonate system is determined for the most part by the amount of calcium carbonate that can be incorporated therein. For every 10 to 12 base numbers of overbasing, approximately 1 wt. percent of calcium carbonate is needed. Thus, about, about 25 wt. percent of calcium carbonate must be incorporated into a metal sulfonate concentrate to attain a total base number in the range of about 275 to 300. In order to stabilize the colloidal dispersion of calcium carbonate, a certain minimum amount of metal sulfonate must be used. This has been determined to be about 0.11 mole of sulfonate per mole of carbonate. Preferably, about 0.13 to about 0.14 mole of sulfonate will be used per mole of carbonate. If the required minimum amount of sulfonate is not used, the product will be undesirably hazy and it will exhibit poor filtration rates during the filtration step. Furthermore, the desired total base number will not be attained. Usually there is no economic advantage in using appreciably more metal sulfonate than is required to give the proper stability.

The amount of promotor needed for the overbasing reaction will vary somewhat with the particular promotor that is used. Generally, the amount of promoter will range from about 0.3 to about 8 wt. percent. In the case of amine promoters, and particularly alkanol amine promoters, generally about 1 to 5 wt. percent will be used, and preferably about 2 to 3.5 wt. percent, based on the reaction mixture. The amount of promoter required is not a critical feature of the invention, since the use of various promoters for the overbasing of sulfonates is well-known in the art. If insufficient promoter is used, the reaction of the lime with carbon dioxide will stop prematurely. In the case of the preferred alkanol amine promoters and particularly with monoethanol amine, a large excess will often cause the formation of an undesirable grease-like dispersion. While in most instances, an amine promoter alone may be used, in other cases $CO_2$ take-up is aided by employing an alkyl phenol as an auxiliary promoter in an amount ranging generally from about half the weight of amine to about equal weights of amine and phenol.

It will be noted that the products obtained from the process described herein are in the form of a concentrate which will usually contain from 40 to 60 wt. percent of oil, the rest being the additive product. This concentrate can then be blended into mineral oil compositions such as crankcase lubricants, industrial oils, and the like and may also be added to light mineral oils, kerosenes, or the like to form slushing oils and similar compositons. The overbased sulfonates may be employed in lubricating oil compositions in conjunction with other metal soaps, metal alkyl phenates, metal alcoholates, metal naphthenates or other detergents or dispersants, V.I. improvers, pour point depressants, antioxidants, and the like. A particularly effective use for the sulfonates is as rust inhibitors in fully compounded detergent crankcase oils containing V.I. improvers, detergent-dispersant inhibitors, pour point depressants, antiwear agents, etc.

The preferred overbased calcium sulfonate concentrates prepared in accordance with the present invention will contain from about 27 to 35 wt. percent of calcium hydrocarbon sulfonate, and from about 11 to 13 wt. percent of total calcium.

The preferred products will also usually contain from 0 to 3 wt. percent of a $C_6$ to $C_{12}$ alkyl phenol, from about 1.2 to 2.5 wt. percent of an alkanolamine having 2 to 5 carbon atoms per alkyl group, and from 0 to 0.5 wt. percent of water.

Especially preferred are products containing from 27 to 35 wt. percent of a calcium sulfonate derived from a hydrocarbon sulfonic acid having a molecular weight in the range of about 420 to 550, from 22.5 to 26.5 wt. percent of calcium carbonate, from 0 to 3 wt. percent of nonyl phenol, from 1.5 to 2.2 wt. percent of monoethanolamine, and from 0 to 0.4 wt. percent of water.

This invention will be better understood when reference is made to the following examples, which include a preferred embodiment.

Example 1

There were added to a reaction vessel 200 grams of a solvent neutral mineral lubricating oil having a viscosity of 150 SUS at 100° F., 75 grams of alkyl phenols, 2200 grams of a calcium sulfonate concentrate, and 90 grams of monoethanolamine. The monoethanolamine contained 2 wt. percent of water. The calcium sulfonate concentrate was made up of 55 wt. percent of diluent mineral lubricating oil and 45 wt. percent of a calcium petroleum sulfonate of about 900 molecular weight, i.e. the calcium salts of petroleum sulfonic acids of about 450 molecular weight. The alkyl phenol was a mixture of mono- and di-nonyl phenol that had been prepared by alkylating phenol with tripropylene and consisted of about 65 to 70 wt. percent of nonyl phenol and about 30 to 35 wt. percent of dinonyl phenol. The mixing of the described liquid components was conducted at a temperature of about 160° F. To this mixture there was added 700 grams of dry slaked lime. The free water concentration resulting from introduction of water with the slaked lime and the monoethanolamine amounted to approximately 0.1 wt. percent based on total reactants. After the lime had been added, the temperature of the mixture was raised to about 265° F. Then over a period of about six hours while the temperature was maintained in the range of 265 to 275° F., a stream of carbon dioxide was passed through the reaction mixture, the mixture being subjected to agitation during this period. The total amount of carbon dioxide introduced over the six-hour period amounted to about 110 mole percent based on the quantity of lime used. The pressure on the reactor vessel was atmospheric. Under these conditions it was determined that about 63 weight percent of the water formed during the reaction of the carbon dioxide with the lime was continuously removed from the reaction vessel. At the end of the reaction period the mixture was heated to 400° F. and blown with a stream of nitrogen for two hours to reduce the water content. The thus treated mixture was then removed from the vessel and filtered with the aid of diatomaceous earth. The composition of the finished product, which had a total base number of about 300, was 29.2 wt. percent of calcium sulfonate, 2.2 wt. percent of nonyl phenol, 24.8 wt. percent of calcium carbonate, 1.9 wt. percent of monoethanolamine, 41.6 wt. percent of diluent oil, and 0.3% of water.

Example 2

Example 1 was repeated exactly, using the same quantities of the reactants and the same reaction conditions, with the exception that the alkyl phenols were omitted. The product that was obtained had a base number of about 300 and contained 11.5 weight percent total calcium, of which about 1.8% can be attributed to the calcium sulfionate and the remaining 9.7% can be attributed to calcium carbonate. The principal difference that was noted between this preparation and the preparation of Example 1 was that there was slightly less sediment in the product prior to filtration in the Example 1 preparation as compared to Example 2. This indicates that the alkyl phenol aided to some extent in promoting the take-up of carbon dioxide. The sediment appeared to consist primarily of unreacted lime and some agglomerated calcium carbonate.

Example 3

A number of runs were made repeating the procedure of Example 1, but adjusting conditions so that the amount of water removed during the reaction was changed. In some cases the rate of water removal was great enough to stop the reaction. In other cases the rate of water removal was so low as to leave too great a water concentration, causing colloid agglomeration, which resulted in haze formation, sedimentation, and loss of base number. From the data thus obtained from this series of reactions, graphs were constructed showing the relationship between water removal rates and the utilization of the lime in the reaction. These graphs are shown in the drawing. Lime utilization usually does not exceed about 95 percent; hence the plotted lines do not extend to 100 percent utilization. Line A plots the formation of water against the extent of the reaction as denoted by weight percent of lime utilization. Line B similarly plots the percent of lime utilization against the rate of water removal above which the reaction ceased. Line D plots the water removal rate below which there was excessive agglomeration of colloid. Line C plots a removal rate that gives an acceptable product having essentially no haze. Line B establishes that if the water removal rate exceeds 80% of the water formation rate, the reaction cannot be conducted to completion. Line D establishes that if the water removal rate is less than about 60% of the water formation rate the build-up of water is so great that acceptable products cannot be obtained from the standpoint of desired base number or lack of haze. It is thus seen from line D that it is preferred that there be no more than about 1.2 wt. percent of water present at the 40 percent reaction point and no more than about 1.6 wt. percent of water present at the 60 percent reaction point.

The data points appearing on line B and in the area intermediate lines A and B were obtained by determining the amount of water that had been removed and the amount of lime utilization that had been accomplished for each reaction where a "cut-off" of the reaction occurred before completion. Lime utilization is defined as the amount of lime that had been converted to $CaCO_3$ expressed as a percentage of the amount of lime charged to the reaction mixture.

Example 4

Using the procedure described in Example 1, 198.45 pounds of the calcium petroleum sulfonate concentrate described in Example 1, 4.95 pounds of the nonyl phenol mixture described in Example 1, 5.96 pounds of ethylene diamine and 64.5 pounds of slaked lime were mixed into 39.6 pounds of solvent neutral mineral lubricating oil of 150 SUS viscosity (at 100° F.). The reaction temperature, reaction time and carbon dioxide treatment were the same as described in Example 1. The product obtained after filtration through diatomaceous earth had a total base number of about 300 and contained 26.8 weight percent of calcium sulfonate, 44.3% of diluent oil and 23.5% of calcium carbonate.

Example 5

A mixture of 1000 grams synthetic alkyl benzene sulfonic acids of 480 molecular weight, 85 grams of lime and 1400 grams of solvent refined mineral lubricating oil (100 SSU at ° F.) was heated in a reactor to about 195° F. over a period of about 15 minutes. Then 280 grams of lime was added, followed by 90 grams of monoethanolamine and then 75 grams of nonyl phenol. After this, the temperature of the reaction mixture was raised to 275° F. The latter temperature was maintained while the mixture was treated with carbon dioxide in the same manner as described in Example 1. The water stripping rate in this particular preparation was about 75 weight percent of the water being formed in the reaction. The product obtained after filtration was visually clear and had a total base number of about 300. It contained 25.0 weight percent of calcium carbonate, 29.2 weight percent of calcium sulfonate and 42 weight percent of diluent oil.

Example 6

The procedure of Example 1 is repeated, substituting 100 grams of dipropanolamine for monoethanolamine as the promoter.

Example 7

In a manner similar to Example 1, a preparation of overbased calcium sulfonate was made using the materials set forth below.

| | Wt. percent |
|---|---|
| Calcium alkyl aromatic sulfonate (about 1900 MW) | 24.5 |
| Calcium petroleum sulfonate (about 900 MW) | 1.5 |
| Monoethanol amine | 2.5 |
| Nonyl phenol | 1.6 |
| Petroleum lubricating oil diluent | 42.2 |
| Stearic acid | 3.3 |
| Lime $(Ca(OH)_2)$ | 23.1 |
| Na-xylene sulfonate | 0.1 |
| Water | 1.2 |

Each of the sulfonates was provided as a 45 wt. percent concentrate in lubricating oil; however, the above percentages are on an actual ingredient basis and the oil content of each concentrate is reflected in the percentage figure for the lubricating oil diluent, which is the sum of 10.5 wt. percent of a solvent refined neutral mineral lubricating oil of 100 SSU viscosity of 100° F. and 31.7 wt. percent total diluent oil in the two concentrates.

The sodium xylene sulfonate, which served as an auxiliary promoter, was employed as a 10 wt. percent solution in water. The 1.3 wt. percent of this solution that was used is reported in the above listing as 0.1 wt. percent of the xylene sulfonate and 1.2 wt. percent of water.

The above components were simply mixed together and the mixture was brought up to reaction temperature, which was 240° F. During the period of heating to attain this temperature the quantity of water that was driven off reduced the water concentration to about 0.8 weight percent before $CO_2$ introduction began. Heating at 240° F. and introduction of $CO_2$ were continued for a period of 5 hours, the total amount of $CO_2$ being about 110 percent of the amount theoretically required to react with the lime. Reaction conditions were such that about 62 percent of the water formed during the reaction was removed. Reduction of water in the final product and filtration through diatomaceous earth were effected in the same manner as in Example 1. The product had a total base number of about 285.

Example 8

A base oil was prepared by blending together by simple mixing 81 volume percent of a solvent neutral mineral lubricating oil of 100 SUS viscosity at 100° F., 8.5 volume percent of a solvent neutral mineral lubricating oil of 450 SUS viscosity at 100° F., and 10.5 volume percent of a mineral oil concentrate containing 20 volume percent of 15,000 molecular weight polyisobutylene. The base oil thus prepared was in the SAE-10W-30 viscosity range. Crankcase lubricating oils were prepared by mixing together 94.3 volume percent of the base oil thus prepared, 0.5 volume percent of a pour point depressant comprising a mixture of wax-alkylated naphthalene and a $C_{10}$ to $C_{18}$ alkyl fumarate-vinyl acetate copolymer, 3.5 volume percent of an ashless dispersant concentrate, 1.0 volume percent of an antiwear agent concentrate, and 0.7 volume percent of an overbased calcium sulfonate concentrate. The blends differed from each other only in the particular overbased sulfonate that was used. The ashless dispersant concentrate was a 70 wt. percent concentrate, in a petroleum lubricating oil, of a commercially available imide condensation product of about equimolar proportions of tetraethylene pentamine and an alkenyl succinic anhydride, the latter having been derived by condensation of polyisobtuylene of about 1000 molecular weight with maleic anhydride. The antiwear concentrate was an oil solution consisting of about 25 wt. percent of petroleum lubricating oil and about 75 wt. percent of mixed zinc dialkyl dithiophosphates prepared by treating a mixture of isobutanol and mixed amyl alcohols with $P_2S_5$ followed by neutralizing with zinc oxide. In one of the blends the overbased calcium sulfonate was the product of Example 1. In the other blend, the overbased sulfonate was a purchased material consisting of an overbased calcium sulfonate concentrate (in lubricating oil) of about 300 base number, containing about 11.4 wt. percent total calcium and derived from alkyl aromatic sulfonic acids of about 420 molecular weight (as the sodium salt).

Each of the blends prepared as described was subjected to an MS Sequence V engine test in a Lincoln engine. At the end of each test the various parts of the engine were rated in accordance with the MS Sequence V procedure. This procedure is well known in the automotive industry and is also known as Ford Test Method BJ-11-4, dated January 1965. It is described in ASTM Special Technical Publication 315A. At the end of each test, various parts of the engine are rated on a merit basis wherein 10 represents a perfectly clean part, and lesser numbers represent increasing degrees of deposit formation. The various ratings are then totalled and averaged on a basis of 50 as a perfect rating. The results obtained with the blends described above are given in the following Table I.

TABLE I.—MS SEQUENCE V TEST RESULTS—MERIT RATINGS

| Sulfonate Used in Blend | Piston Skirt Varnish | Total Varnish | Sludge | Plugging, Percent | |
|---|---|---|---|---|---|
| | | | | Ring | Screen |
| Example 1 | 8.4 | 42.8 | 47.9 | 0 | 0 |
| Purchased Product | 8.0 | 38.0 | 40.8 | 4 | 0 |
| (Acceptable Levels) | 7.0 | 35 | 30 | 30 | 30 |

It is to be noted that the product of Example 1 was somewhat better in performance than commercially available overbased sulfonate.

Example 9

Fully formulated crankcase lubricating oils were prepared by mixing together 94.65 volume percent of the base oil, 0.5 volume percent of the pour point depressant, 0.75 volume percent of the antiwear agent concentrate described in Example 8 together with 2.8 volume percent of an ashless dispersant concentrate, and 1.3 volume percent of an overbased calcium sulfonate concentrate. In one of the blends the overbased calcium sulfonate was the product of Example 1. In the other blend the overbased sulfonate was the purchased concentrate described in Example 8.

The ashless dispersant concentrate, which consisted of about 70 wt. percent of active ingredient and 30 wt. percent of diluent mineral oil was prepared by mixing 31.5 pounds of solvent neutral mineral lubricating oil (150 SUS at 100° F.) with 70 pounds of polyisobutenyl propionic acid and reacting the mixture with 3.4 pounds of tetraethylene pentamine at 300° F. for 9 hours, followed by filtration. The polyisobutenyl propionic acid was prepared by chlorinating polyisobutylene of 780 molecular weight to a chlorine content of 4.3%, and reacting about 10 parts of the chlorinated product with one part of acrylic acid at about 425° F. for about 6 hours at a pressure of 20 p.s.i.g.

Each of the lubricating oil blends prepared as described was subjected to a MS IIA, IIIA rust performance test in a 394 cu. in. Oldsmobile engine. The test is described in SAE Paper 650,867 by Kabel and Bennett, dated November 1965. At the end of each test the various parts of the engine were rated in accordance with the test procedure, using a merit rating system wherein the maximum of 10 is a perfectly clean part. The results obtained are given in the following Table II.

TABLE II.—MS IIA, IIIA TEST RESULTS—MERIT RATINGS

| | Example 1 Product | Purchased Product |
|---|---|---|
| Piston Skirt Varnish | 9.7 | 9.5 |
| Average Varnish | 9.8 | 9.8 |
| Average Sludge | 9.7 | 9.7 |
| Average Wear, Inches | 0.0014 | 0.0008 |
| Bearing Weight Loss, mgs | 100 | 140 |
| Average Rust | 8.5 | 8.5 |

The above test results show that the product of Example 1 was just as effective as a rust inhibitor as the purchased product and was somewhat more effective in preventing bearing corrosion.

It is to be understood that the foregoing examples are merely illustrative of the invention and are not intended to limit it in any manner; nor is the invention to be limited by any theory regarding its operation.

What is claimed is:
1. In a process wherein an overbased metal sulfonate is prepared by contacting a mixture of diluent oil, oil soluble sulfonic acid material, hydrated lime and promoter with carbon dioxide, said sulfonic acid material being selected from the group consisting of hydrocarbon sul- fonic acids and metal salts thereof, and said carbon dioxide being used in at least sufficient quantity to convert to colloidally dispersed calcium carbonate all lime not used for formation of sulfonate salt, the improvement which comprises maintaining the water content of said mixture, at all times during said contacting with carbon dioxide, within the limits of 0.1 to 1.75 wt. percent, based on said mixture, said promoter being selected from the group consisting of alkylene polyamines of from 2 to 3 carbon atoms per alkylene group and from 2 to 4 amino groups per molecule and alkanolamines of from 2 to 5 carbon atoms per alkyl group, said promoter being present in an amount of from 1 to 5 weight percent based on the total reaction mixture.

2. Improvement as defined by claim 1 wherein the initial water concentration is in the range of about 0.1 to about 0.8 wt. percent.

3. Improvement as defined by claim 1 wherein there is initially present in said reaction mixture about 0.1 to 0.5 wt. percent of water, and wherein during said contacting step from 60 to 80 wt. percent of the water evolved by conversion of lime to calcium carbonate is continuously removed, thereby gradually increasing said water content until it reaches a level of about 1.5 to 1.75 wt. percent at the completion of the reaction.

4. Improvement as defined by claim 1 wherein said hydrocarbon sulfonic acids have molecular weights within the range of about 400 to 1200.

5. Improvement as defined by claim 1 wherein said hydrocarbon sulfonic acids have molecular weights within the range of about 400 to 600.

6. Improvement as defined by claim 1 wherein said sulfonic acid material comprises a calcium hydrocarbon sulfonate.

7. Improvement as defined by claim 1 which includes the step of removing water from the reaction mixture at the completion of the reaction to reduce the water concentration to a value no greater than about 0.5 weight percent based on the reaction mixture.

8. An overbased calcium sulfonate prepared by the process of claim 1, said concentrate having a total base number of at least 225.

References Cited

UNITED STATES PATENTS

| | | | |
|---|---|---|---|
| 3,027,325 | 3/1962 | McMillen et al. | 252—33 |
| 3,242,079 | 3/1966 | McMillen | 252—33 |

FOREIGN PATENTS

| | | |
|---|---|---|
| 212,328 | 1/1958 | Australia. |

PATRICK P. GARVIN, *Primary Examiner.*

U.S. Cl. X.R.

252—18